(12) United States Patent
Cytron et al.

(10) Patent No.: US 6,644,111 B2
(45) Date of Patent: Nov. 11, 2003

(54) APPARATUS AND METHOD FOR MEASURING EXIT VELOCITY OF A GUN ROUND

(75) Inventors: Sheldon J. Cytron, Mountain Lakes, NJ (US); Christopher J. LaVigna, Olney, MD (US); Harry G. Kwatny, Elkins Park, MD (US); Justin M. Bowlus, Hyattsville, MD (US); Shiping Chen, Fremont, CA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/248,666

(22) Filed: Feb. 6, 2003

(65) Prior Publication Data

US 2003/0156272 A1 Aug. 21, 2003

Related U.S. Application Data

(60) Provisional application No. 60/357,561, filed on Feb. 15, 2002.

(51) Int. Cl.[7] .......................... G01L 5/14; G01N 33/22; G01P 15/08; G01P 15/13; G01P 3/36
(52) U.S. Cl. ..................... 73/167; 73/35.15; 73/514.26; 356/28
(58) Field of Search ................................. 73/35.15, 167, 73/514.26; 250/231.19; 356/28

(56) References Cited

U.S. PATENT DOCUMENTS

| | | | | | |
|---|---|---|---|---|---|
| 5,357,796 | A | * | 10/1994 | Jamison | 73/167 |
| 6,175,108 | B1 | * | 1/2001 | Jones et al. | 250/227.14 |
| 6,354,147 | B1 | * | 3/2002 | Gysling et al. | 73/61.79 |
| 6,422,084 | B1 | * | 7/2002 | Fernald et al. | 73/705 |
| 6,450,037 | B1 | * | 9/2002 | McGuinn et al. | 73/705 |
| 6,536,291 | B1 | * | 3/2003 | Gysling et al. | 73/861.42 |

* cited by examiner

Primary Examiner—Thomas H. Tarcza
Assistant Examiner—Brian Andrea
(74) Attorney, Agent, or Firm—John F. Moran

(57) ABSTRACT

An apparatus for measuring exit velocity of a round from a muzzle of a gun barrel includes a first optical fiber having a first fiber optic Bragg grating (FBG) circumferentially attached to the gun barrel at the muzzle and a second FBG circumferentially attached to the gun barrel further from the muzzle than the first FBG; a coupler that receives one end of the first optical fiber; a light source connected by a second optical fiber to the coupler for supplying light to the first optical fiber; a third optical fiber comprising an FBG notch filter, the third optical fiber being connected to the coupler to receive light reflected from the first optical fiber; a notch filter mount attached to the gun barrel, the FBG notch filter being disposed in the notch filter mount; a photodetector connected to an end of the third optical fiber; and data processing electronics electrically connected to the photodetector.

16 Claims, 5 Drawing Sheets

APPARATUS AND METHOD FOR MEASURING EXIT VELOCITY OF A GUN ROUND

CROSS REFERENCE TO RELATED APPLICATIONS

This application claims the benefit of priority of U.S. provisional patent application Ser. No. 60/357,561 filed on Feb. 15, 2002, entitled "Embedded Fiber Optic Sensors for Gun Barrel Diagnostics," which application is expressly incorporated by reference.

FEDERAL RESEARCH STATEMENT

[The inventions described herein may be manufactured, used and licensed by or for the U.S. Government for U.S. Government purposes.]

BACKGROUND OF INVENTION

The invention relates to measuring the velocity of a round exiting a gun barrel. The need for measuring the velocity of a round exiting a gun barrel has existed for a number of years. Since the 1980's, with the early development of smart bursting ammunition, a need developed for a way to effectively gauge travel time and detonation point of a round. This problem became more acute with the advanced development of anti-personnel air bursting munitions that require accurate round velocities.

Prior laboratory methods for measuring exit velocity include: yaw screens, inductive rings, foil strain gages, bore pressure sensors, MEMs device in round and muzzle velocity radar. Prior field methods for measuring exit velocity include: MEMS devices in round, inductive rings and muzzle velocity radar.

The prior laboratory methods listed above are not suited for field conditions. Yaw screens are inductive wire loops on stands that are set up down range of the projectile near the muzzle. By design they are only useful in range testing situations. Foil strain gage systems are affected adversely by electromagnetic interference, require frequent calibration, zeroing and adjustment, and do not have the required bandwidth for high velocity projectiles. Bore pressure transducer-based methods require significant modifications to the barrel that are not conducive to field application since they require drilling through the barrel into the bore for insertion of the sensors.

This modification weakens the barrel and provides a potential path for water and contaminants to enter the bore. Muzzle velocity radar is expensive, bulky, emits significant electromagnetic radiation markedly increasing the risk of detection, and is typically only able to measure the round exiting velocity for the first round in a burst in automatic mode. MEMS devices in the round are expensive and take up valuable space.

The prior field methods are also unsatisfactory. A fielded inductive ring based system places three heavy inductive rings outboard of the muzzle blast area to measure the round exiting velocity. The addition of this significant extra mass degrades the performance of the gun stabilization system and adversely affects the gun system dispersion. Fielded muzzle velocity radars, similar to their laboratory grade cousins mentioned above, are costly, bulky, emit electromagnetic radiation thereby markedly increasing the risk of detection, and are typically only able to measure the round exiting velocity for the first round in an automatic burst mode.

SUMMARY OF INVENTION

The invention solves the problem of being able to determine the exiting velocity of the round in a reliable, accurate and cost-effective manner. It accomplishes this for any gun system by utilizing direct strain measurements made on the gun barrel using surface mounted or embedded fiber optic sensors. The measurements can be made for single shot or automatic rapid firing modes. The round exit velocity measurement can be used for air burst munitions system applications to enable precise bursting at desired range and improvement of ballistic solutions leading to improved projectile on target performance.

The invention provides a cost effective means to accurately measure the round exit velocity from a broad spectrum of gun barrels. The invention is rugged and can withstand shock, vibrations and high temperatures typically found on gun barrels. The invention is designed to measure high sampling rates of rapid-fire munitions so that each round can be interrogated and given the proper information with regards to time to burst. Temperature compensation as the gun barrel heats up has been incorporated into the invention to maintain accurate velocity measurements during the full firing scenario.

The invention will be better understood, and further objects, features, and advantages thereof will become more apparent from the following description of the preferred embodiments, taken in conjunction with the accompanying drawings.

BRIEF DESCRIPTION OF DRAWINGS

In the drawings, which are not necessarily to scale, like or corresponding parts are denoted by like or corresponding reference numerals.

DETAILED DESCRIPTION

The round exiting velocity measurement invention operates as follows. After ignition, the propellant gases generate very high levels of pressure (>50 ksi) and start to accelerate the projectile (round) down the bore of the gun barrel. As the projectile moves, the gas pressure behind it generates a moving hoop strain wave, i.e., the pressure causes measurable increase in the diameter of the barrel and this disturbance moves with the projectile. Under the influence of these high-pressure gases the projectile reaches very high velocities, up to 1550 m/s or even more for some gun systems. As the projectile nears the muzzle of the barrel, the acceleration slows and a nearly constant velocity is reached. This velocity can be accurately determined from the moving hoop strain wave by measuring the elapsed time for the strain wave to pass each of two barrel-surface mounted (located near the muzzle) strain gages of known separation distance.

The invention works by timing the passage of the hoop strain wave between a calibrated spacing of fiber strain gages and computes the velocity by dividing the spacing by the measured elapsed time to obtain the average velocity of the projectile in the bore between the fiber strain gages. The projectile may experience a small additional acceleration for a short distance after the last gage position. If so, a correction factor based on live-fire calibration may be added to the measured velocity to arrive at the actual round exit velocity.

In the invention, fiber optic Bragg grating (FBG) sensors are the strain sensing elements. An instrumentation system comprising fiber optic and electronic components converts the signals produced by the sensors into useable voltages for post processing. The advantages of using an optical fiber are its ability to withstand both shock and vibration commensurate with live gun firings as well as to withstand the high temperatures observed in the gun barrel during a typical firing scenario.

Figure 1:
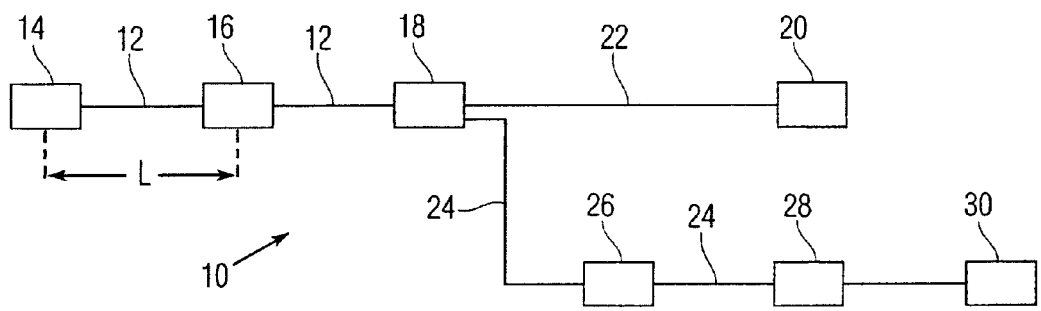
FIG. 1 is a schematic drawing of the optical components of the invention.
Figure 2:
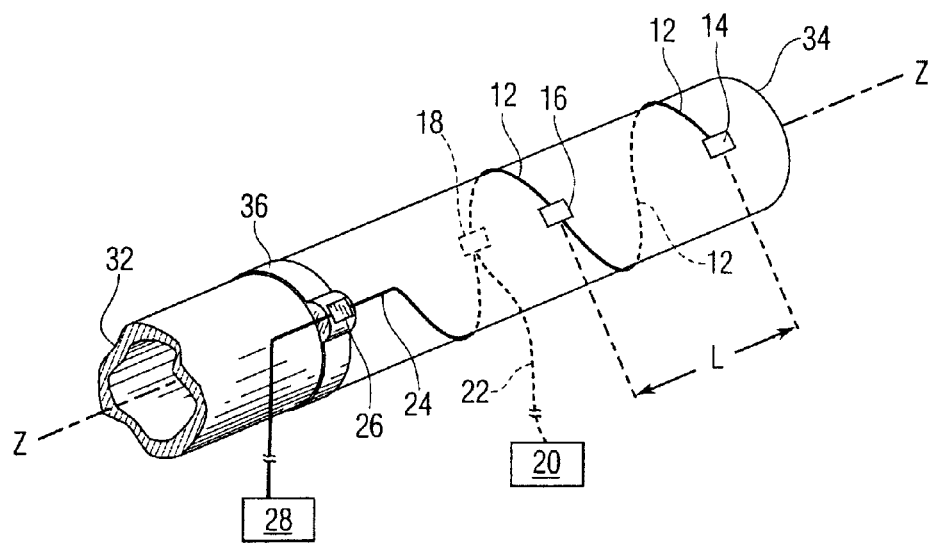
FIG. 2 is a schematic drawing of the components mounted on a gun barrel.

FIG. 1 is a schematic drawing of the optical components of one embodiment 10 of the invention. FIG. 2 is a schematic drawing of the components mounted on a gun barrel 32. Referring to FIGS. 1 and 2, the apparatus 10 includes a first optical fiber 12 comprising a first fiber optic Bragg grating (FBG) 14 circumferentially attached to the gun barrel 32 at the muzzle 34 of the gun barrel 32. Optical fiber 12 includes a second FBG 16 circumferentially attached to the gun barrel 32 further from the muzzle 34 than the first FBG 14. First FBG 14 and second FBG 16 are separated by axial linear distance L. The first and second FBGs 14,16 are oriented perpendicular to the longitudinal axis z of the gun barrel. Optical fibers 12,24 are bonded to gun barrel 32 with, for example, epoxy. It is noted that the FBGs 14,16 are internally formed in the optical fiber 12.

A coupler 18 receives one end of the first optical fiber 12. A light source 20 is connected by a second optical fiber 22 to the coupler 18. Preferably, the light source 20 is a broadband light source. A third optical fiber 24 includes an FBG notch filter 26. The third optical fiber 24 is connected to the coupler 18 to receive light reflected by the FBGs 14,16 in the first optical fiber 12. A notch filter mount 36 is attached to the gun barrel 32 with the FBG notch filter 26 being disposed in the notch filter mount 36. A photodetector 28 is connected to the third optical fiber 24. Data processing electronics 30 are electrically connected to the photodetector 28. Preferably, the first, second and third optical fibers 12,22,24 are single-mode optical fibers. It is noted that the FBG notch filter 26 is internally formed in the optical fiber 24.

The principle of operation of the inventive round exit velocity measurement apparatus is the response of the bonded FBGs 14,16 to a measured strain, with associated compensation for temperature fluctuations. Because the invention utilizes the optical technology of Bragg gratings, a shift of the Bragg wavelength $\lambda_B$, in wavelength space is reflective of a thermal-mechanical shift caused by the presence of either a strain or a temperature change. Accordingly, for a Bragg grating sensor bonded to the surface of a structure, the strain and temperature are related to the change in the Bragg wavelength by $$\frac{\Delta\lambda_B}{\lambda_B} = P_e\varepsilon + [P_e(\alpha_s - \alpha_f) + \zeta]\Delta T \tag{1}$$

where $\alpha_s$ and $\alpha_f$ are the coefficients of thermal expansion of the structural material and fiber, respectively, $\zeta$ is the thermal-optic coefficient, epsilon is the fiber axial strain and $P_e$ is the strain-optic coefficient.

The Bragg gratings 14,16 are oriented so that they are sensitive to hoop strain, i.e. mounted circumferentially perpendicular to the barrel axis z around the outer surface of the barrel 32 and bonded in place. The fast rising hoop strain caused by the projectile is transferred from the barrel surface to the FBGs 14,16 and enables detection of the moving projectile as it reaches each FBG. Therefore, the hoop strain dilation can be detected as it passes each bonded Bragg grating sensor 14,16 by monitoring the shift in $\lambda_B$. By positioning the two strain sensors 14,16 at a fixed separation distance L, at or near the muzzle 34, and measuring the time difference, delta t, of the onset of the shift in $\lambda_B$, the round exit velocity can be calculated as:

$$V_{re} = \frac{L}{\Delta t} \tag{2}$$

From Equation 2, we can calculate the minimum time resolution, $d\Delta t$, required for the sensing system to measure the round exit velocity to the required resolution, $dV_{re}/V_{re}$ and express it as $$d\Delta t = (L/V_{re})(dV_{re}/V_{re}) \tag{3}$$

Assuming L=0.25 m, $V_{re}$=1400 m/s and $dV_{re}$=7.8/s, we can obtain the minimum time resolution of the sensing system as 1 $\mu$s, which translates to a sensor bandwidth of 1 MHz. It is important to note that the round exit velocity measurement requires high speed, not high accuracy, for the two Bragg grating strain sensors 14,16 and the detection system. That is, the sensor system needs to be capable of detecting the onset of the shift in $\lambda_B$ with a resolution of 1 $\mu$s, but does not need to accurately measure the amount of shift.

Figure 3:
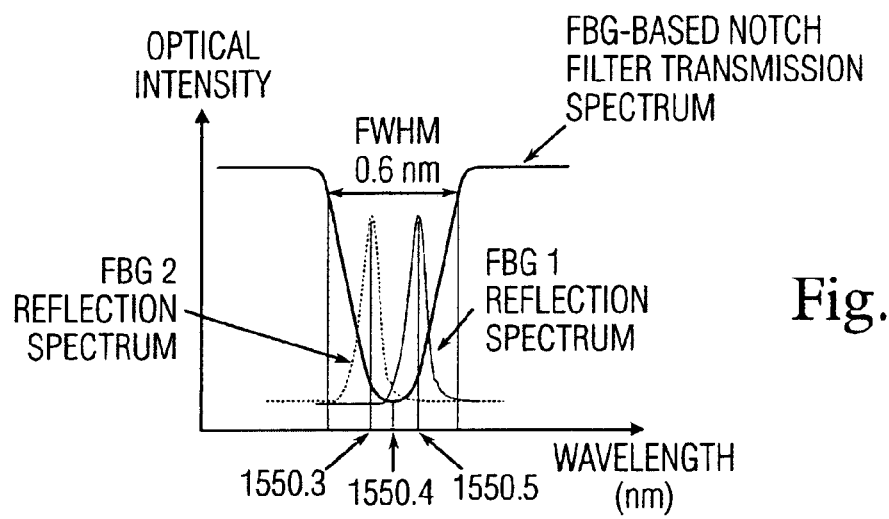
FIG. 3 is a plot of optical intensity spectra versus wavelength for the fiber Bragg grating sensors (FBG1 and FBG2) and the fiber Bragg grating notch filter transmission spectrum in an unstrained condition.

To meet the high-speed requirement, an innovative method for detection of the shift in $\lambda_B$ is incorporated into the invention. The method comprises employing an FBG notch filter 26 with a precisely defined optical transmission spectrum. An example of the spectrum of the FBG notch filter 26 is shown in FIG. 3. In FIG. 3, both FBGs 14,16 are unstrained thereby not permitting any light to pass through the FBG notch filter 26 to the photodetector 28. In a preferred embodiment, the notch filter 26 is designed such that the "notch" in its spectrum contains the peaks of the spectra of the first and second FBGs 14,16, when the FBGs are unstrained. The "notch" of the spectrum of the FBG notch filter 26 has a full width half maximum (FWHM) of about 0.6 nanometers.

Figure 4:
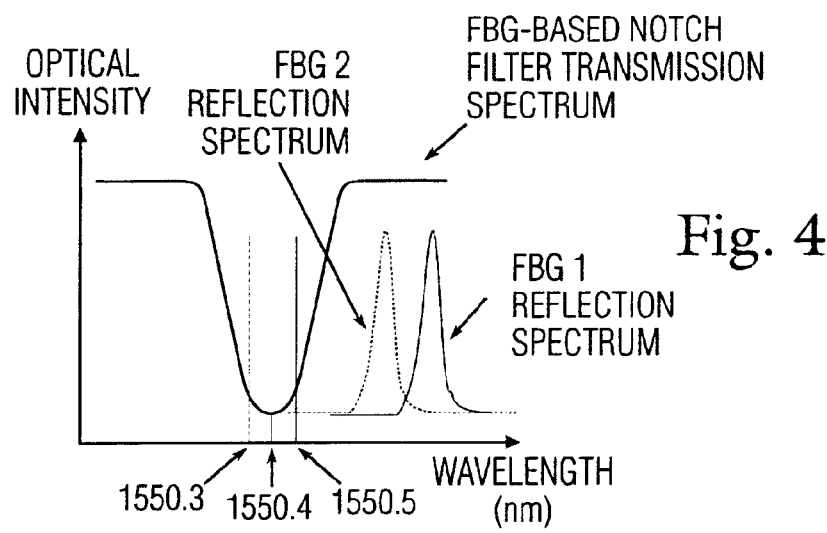
FIG. 4 is a plot of optical intensity versus wavelength for the fiber Bragg grating sensors and the fiber Bragg grating notch filter with the fiber Bragg grating sensors in a strained condition.
Figure 5:
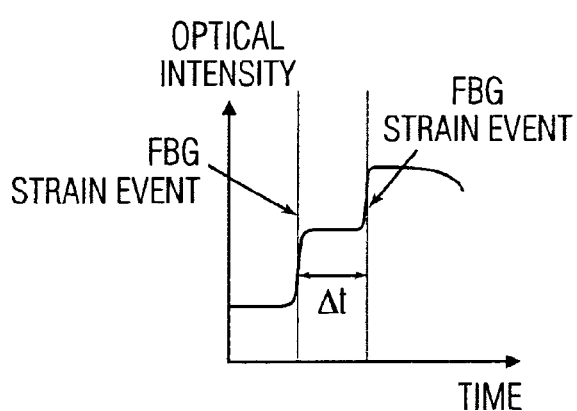
FIG. 5 shows optical output intensity versus time for successive straining of the two fiber Bragg grating sensors.

When the weapon is fired and the hoop strain dilation reaches each FBG 14,16, the FBGs are subjected to a tensile strain stretching which causes the FBGs to increase the $\lambda_B$. As $\lambda_B$ increases, outside the influence of the FBG notch filter 26, light begins to be transmitted through the FBG notch filter 26 and into the photodetector 28. This effect is shown in FIG. 4. Due to the sharp slopes of the FBG notch filter transmission spectrum and the FBGs reflection spectra, even a small shifting of $\lambda_B$ produces a significantly large change in the light reaching the photodetector 28. Therefore, when the hoop strain dilation reaches each FBG 14,16 a sharp step is seen in the photodetector output current. FIG. 5 shows the time response curve from the FBGs as the hoop strain dilation passes both FBGs. The invention is not limited to the spectra shown in FIGS. 3 and 4. FBGs and filters having a variety of other spectra could be used, as long as a recognizable signal is produced as the projectile passes each FBG 14,16.

The FBGs 14,16 are sensitive to thermal as well as mechanically induced strains, i.e., thermally and mechanically induced strains both produce a change in the sensor Bragg wavelength, $\lambda_B$. Thus, there is a need to provide for temperature compensation to avoid perceiving erroneous signals. If temperature compensation were not provided, heating of the gun barrel due to firing or environmental conditions would lead to erroneous measurements. This would occur because the thermal induced Bragg wavelength shift would cause the peak in the Bragg reflection spectra to move outside the influence of the FBG notch filter 26 (exactly as it would under mechanical induced strain) and light would be transmitted to the photodetector 28.

To eliminate this temperature sensitivity, the FBG notch filter center wavelength moves precisely with the peaks in the two barrel mounted FBG spectra as the barrel 32 is subjected to temperature variations. By requiring the FBG notch filter 26 to track with the peaks of the FBGs 14,16, no light will be transmitted to the photodetector 28 as the temperature of the gun barrel 32 varies.

To ensure this notch-tracking requirement, the FBG notch filter 26 is located such that it is subjected to the same thermally induced strain as the barrel mounted FBGs 14,16. The FBG notch filter 26 is disposed in a notch filter mount 36 attached to the surface of the barrel 32. The notch filter mount 36 is designed to have the same temperature expansion characteristics as the barrel itself. That is, the notch filter mount 36 is made of a material having a coefficient of thermal expansion and a thermal conductivity that is substantially the same as the coefficient of thermal expansion and the thermal conductivity of the material of the gun barrel 32. The gun barrel 32 will typically be made of a steel alloy.

Therefore, when the temperature of the surface of the barrel 32 varies as the barrel is subjected to thermal variations such as the heat of firing, the FBG notch filter 26 and the FBGs 14,16 are subjected to the same thermally induced strain. Consequently, the FBG notch filter 26 experiences the same amount of shift in its spectrum as the FBGs 14,16 mounted to the surface of the barrel 32. The relative positions of the FBGs and the FBG notch filter spectra remain unchanged, although the temperature may change. The notch filter mount 36 isolates the FBG notch filter 26 from the hoop strain dilation generated as the projectile passes by the FBG notch filter 26.

Figure 6:
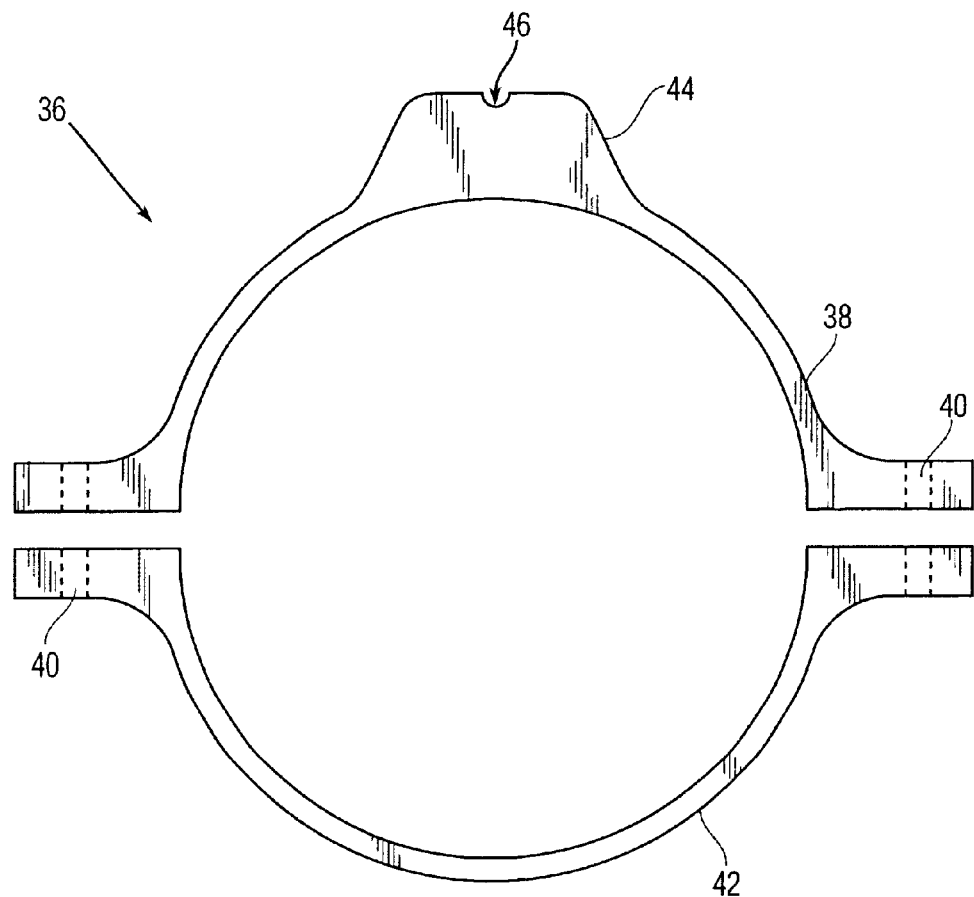
FIG. 6 is a side view of a notch filter mount.

FIG. 6 is a side view of the notch filter mount 36. The notch filter mount 36 includes clamp portions 38 and 42 having flanges with holes 40 therein for fasteners. The clamp portions 38 and 42 fit around barrel 32 and are fixed in place by fasteners inserted through holes 40. Clamp portion 38 includes a thickened portion 44. The top surface of the thickened portion 44 defines a groove 46 for receiving the FBG notch filter 26. Preferably, the notch filter mount 36 is attached to gun barrel 32 such that groove 46 is parallel to the longitudinal axis z of the gun barrel 32. However, the FBG notch filter 26 may also be oriented other than parallel to the axis z. The notch filter mount 36 experiences the same temperature as the gun barrel 32. The thickened portion 44 allows the hoop strain to pass without straining the FBG notch filter 26 mounted in groove 46. That is, the thinner sections of the clamp which are less stiff than the thickened portion 46 absorb essentially all of the hoop strain. The thickness of thickened portion 44 (that is, the thickness from the gun barrel surface to the bottom of groove 46) will vary depending on the caliber of the gun being used.

Multiplexing the FBGs 14,16 into a single fiber 12 results in a single channel system in which the FBGs 14,16 are interrogated independently thereby reducing the need for two channels of sensor signal demodulation optics and electronics. Use of the FBG notch filter 26 results in a simple configuration in which the sharp rising edge of the hoop strain can be detected as a sharp step in light intensity output. A major consideration in the invention is to ensure the repeatability and minimize the complexity of fabrication of the FBG notch filter 26, the optical component that filters the reflected signal from the FBGs 14,16. The FBG notch filter 26 is fabricated using a standard phase mask illuminated by a 244 nm wavelength IR laser. With this fabrication method, the FBG notch filter 26 was produced with the precise FBG notch spectrum required in a low cost repeatable process.

Figure 8A:
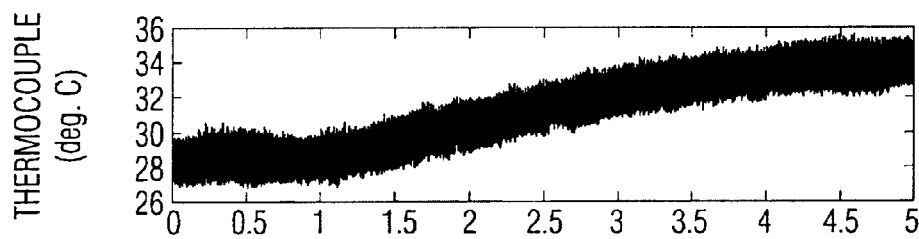
FIG. 8A is a plot of barrel temperature versus time in seconds.
Figure 8B:
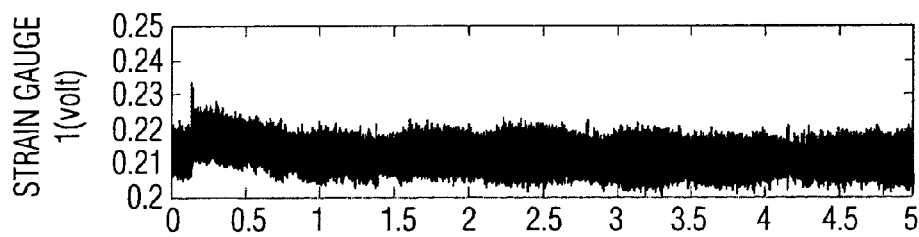
FIG. 8B is a plot of the output of a first FBG subject to the temperature change shown in FIG. 8A.
Figure 8C:
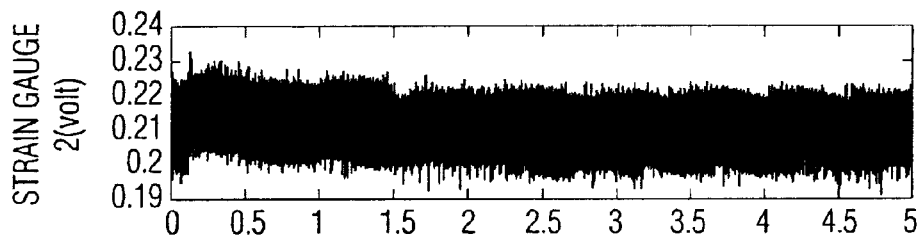
FIG. 8C is a plot of the output of a second FBG subject to the temperature change shown in FIG. 8A.
Figure 9:
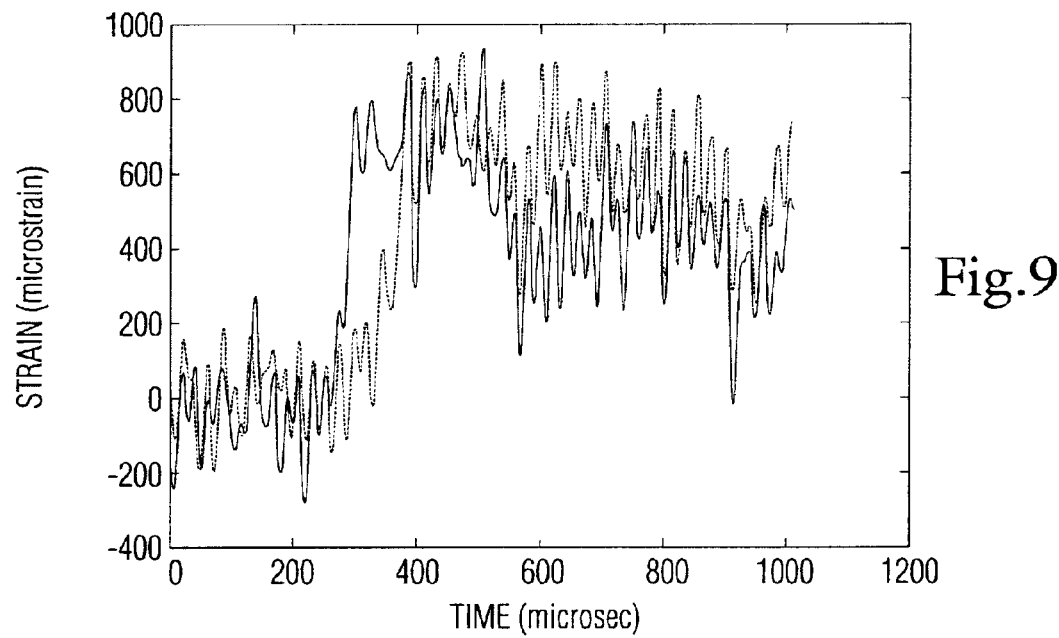
FIG. 9 is a plot of strain for two FBGs versus time in microseconds.

The time response of the shift in spectrum of the FBG notch filter 26 and the FBGs 14,16 due to temperature variation occurs on a much slower time scale than that of the time response of the hoop strain dilation generated by the projectile. This difference in temporal scales of operation of the strain due to the projectile and the strain due to the heating of the barrel may be seen from data in FIGS. 8A–C and 9. FIG. 8A is a plot of temperature versus time in seconds. FIG. 8B is a plot of the output of a first FBG subject to the temperature change shown in FIG. 8A and FIG. 8C is a plot of the output of a second FBG subject to the temperature change shown in FIG. 8A. FIG. 9 is a plot of strain for two FBGs versus time in microseconds.

As a projectile passes past the FBGs 14,16, pulses of light are generated at the photodetector 28. The photodetector 28 converts the optical signal to an electrical current. The data processing electronics 30 produce an electrical voltage that is amplified and digitized. The data processing electronics include a clock chip that calculates the time difference between the pulses. The velocity is then computed using Equation 2 above.

Figure 7:
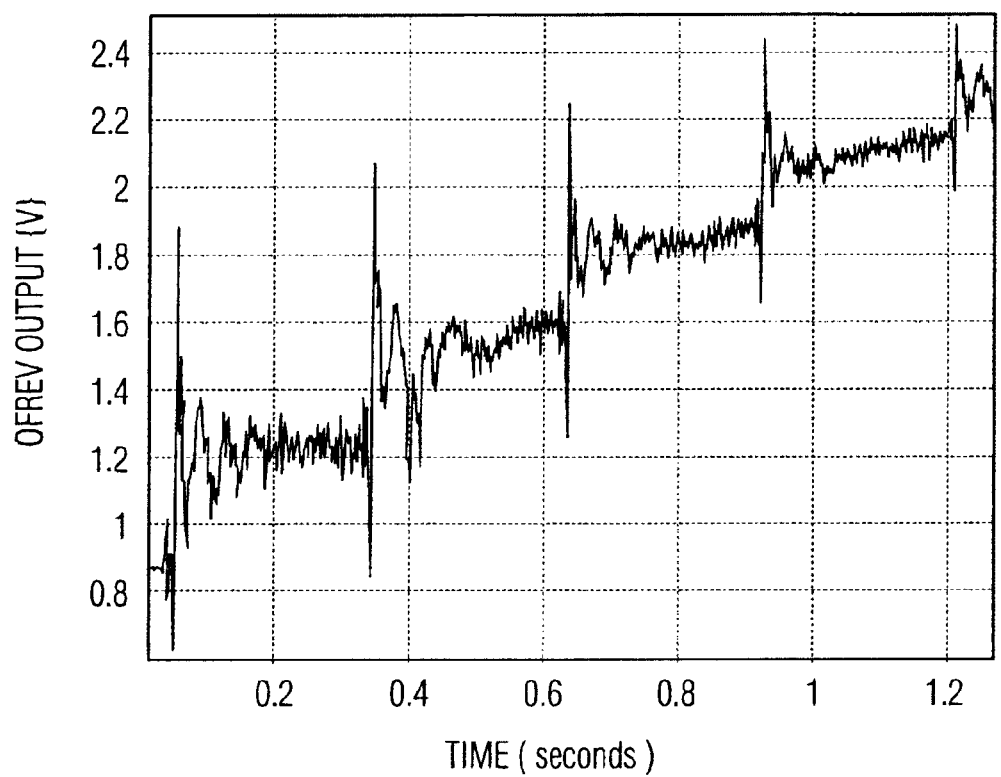
FIG. 7 is a plot of photodetector output voltage versus time for an actual round burst firing.

A test was conducted whereby two FBGs were bonded to a 25 mm bore gun barrel and the gun subjected to a firing burst of ammunition. A muzzle radar system was installed to verify the round exit velocity against the uncompensated values obtained from the uncorrected data. FIG. 7 shows the converted photodetector output illustrating the periodic nature of the signal corresponding to the passage of each round past the two FBGs. Table 1 shows the derived round velocities from the invention compared to the radar measurement method.

TABLE 1

Results of round exit velocity estimates for multiple round burst tests.

| Test no. (round no in burst) | Invention estimated velocity (m/s) | Weibel reference velocity (m/s) | Error (%) |
|---|---|---|---|
| Test 11 (1) | 1082.3 | 1090.7 | −0.8 |
| Test 17 (1) | 1425.8 | 1513.3 | −5.8 |
| Test 19 (1) | 1106.8 | 1094.9 | −1.1 |

Note: Reference values only available for first round in burst due to Weibel MVR limitation.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for measuring exit velocity of a round from a muzzle of a gun barrel, comprising:
    a first optical fiber comprising a first fiber optic Bragg grating (FBG) circumferentially attached to the gun barrel at the muzzle and a second FBG circumferentially attached to the gun barrel further from the muzzle than the first FBG thereby defining an axial linear distance between the first and second FBGs, the first and second FBGs being oriented perpendicular to a longitudinal axis of the gun barrel;
    a coupler that receives one end of the first optical fiber;
    a light source connected by a second optical fiber to the coupler for supplying light to the first optical fiber;
    a third optical fiber comprising an FBG notch filter, the third optical fiber being connected to the coupler to receive light reflected from the first optical fiber;
    a notch filter mount attached to the gun barrel, the FBG notch filter being disposed in the notch filter mount;
    a photodetector connected to an end of the third optical fiber; and
    data processing electronics electrically connected to the photodetector.

2. The apparatus of claim 1 wherein the gun barrel is made of a material having a coefficient of thermal expansion and a thermal conductivity and the notch filter mount is made of a material having a coefficient of thermal expansion and a thermal conductivity that is substantially the same as the coefficient of thermal expansion and the thermal conductivity of the material of the gun barrel.

3. The apparatus of claim 2 wherein the notch filter mount minimizes transmission of hoop strain from the gun barrel to the FBG notch filter while allowing heat transfer from the gun barrel to the FBG notch filter.

4. The apparatus of claim 1 wherein the light source is a broadband light source.

5. The apparatus of claim 3 wherein the notch filter mount comprises two clamp portions that fit around the gun barrel, one of the clamp portions including a thickened portion having a top surface that defines a groove therein for receiving the FBG notch filter.

6. The apparatus of claim 1 wherein the first, second and third optical fibers comprise single mode optical fibers.

7. The apparatus of claim 5 wherein the groove in the top surface of the thickened portion of the clamp portion is parallel to the longitudinal axis of the gun barrel.

8. The apparatus of claim 1 wherein peaks of spectra of the first and second FBGs, in an unstrained condition, lie within a notch of a spectrum of the FBG notch filter.

9. The apparatus of claim 8 wherein the notch of the spectrum of the FBG notch filter has a full width half maximum of about 0.6 nanometers.

10. A method of measuring exit velocity of a round from a muzzle of a gun barrel, comprising:
    providing a first optical fiber comprising a first fiber optic Bragg grating (FBG) circumferentially attached to the gun barrel at the muzzle and a second FBG circumferentially attached to the gun barrel further from the muzzle than the first FBG thereby defining an axial linear distance between the first and second FBGs, the first and second FBGs being oriented perpendicular to a longitudinal axis of the gun barrel;
    directing light into the first optical fiber;
    firing a round in the gun barrel;
    receiving light reflected from the first and second FBGs in a photodetector;
    converting the reflected light to an electrical signal in the photodetector;
    processing the electrical signal to measure a time period for the round to travel the axial linear distance between the first and second FBGs; and
    computing the exit velocity by dividing the axial linear distance by the measured time period.

11. The method of claim 10 further comprising directing the reflected light through an FBG notch filter to compensate for temperature changes in the gun barrel.

12. The method of claim 11 wherein the FBG notch filter is disposed in a notch filter mount attached to the gun barrel.

13. The method of claim 12 wherein the notch filter mount minimizes transmission of hoop strain from the gun barrel to the FBG notch filter while allowing heat transfer from the gun barrel to the FBG notch filter.

14. The method of claim 12 wherein the FBG notch filter is parallel to the longitudinal axis of the gun barrel.

15. The method of claim 11 wherein peaks of spectra of the first and second FBGs, in an unstrained condition, lie within a notch of a spectrum of the FBG notch filter.

16. The method of claim 15 wherein the notch of the spectrum of the FBG notch filter has a full width half maximum of about 0.6 nanometers.

* * * * *